United States Patent
Casaccia et al.

(10) Patent No.: US 8,009,752 B2
(45) Date of Patent: Aug. 30, 2011

(54) MULTI-CARRIER INCREMENTAL REDUNDANCY FOR PACKET-BASED WIRELESS COMMUNICATIONS

(75) Inventors: Lorenzo Casaccia, Rome (IT); Durga Prasad Malladi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 923 days.

(21) Appl. No.: 11/238,791

(22) Filed: Sep. 28, 2005

(65) Prior Publication Data

US 2006/0203924 A1    Sep. 14, 2006

Related U.S. Application Data

(60) Provisional application No. 60/615,254, filed on Oct. 1, 2004.

(51) Int. Cl.
H04B 7/02    (2006.01)
(52) U.S. Cl. .................................. 375/267
(58) Field of Classification Search ........... 375/299, 375/295, 296, 259, 260, 267, 354, 358, 285; 370/479, 480, 481, 482; 455/101, 103, 114.2, 455/39, 68, 69; 398/1, 2, 5, 31; 714/699, 714/746–756, 786, 790
See application file for complete search history.

(56) References Cited

U.S. PATENT DOCUMENTS

| | | | |
|---|---|---|---|
| 5,504,783 A * | 4/1996 | Tomisato et al. | 375/267 |
| 6,198,775 B1 | 3/2001 | Khayrallah et al. | 375/265 |
| 6,317,854 B1 * | 11/2001 | Watanabe | 714/749 |
| 6,704,898 B1 * | 3/2004 | Furuskar et al. | 714/751 |
| 7,065,068 B2 * | 6/2006 | Ghosh et al. | 370/342 |
| 7,151,754 B1 * | 12/2006 | Boyce et al. | 370/328 |
| 2002/0009157 A1 | 1/2002 | Sipola | 375/295 |
| 2002/0150070 A1 * | 10/2002 | Shattil | 370/342 |
| 2003/0043764 A1 * | 3/2003 | Kim et al. | 370/329 |
| 2003/0070129 A1 | 4/2003 | Ball et al. | 714/748 |
| 2003/0072283 A1 * | 4/2003 | Varshney et al. | 370/335 |
| 2003/0097629 A1 | 5/2003 | Moon et al. | |
| 2003/0126536 A1 * | 7/2003 | Gollamudi et al. | 714/748 |
| 2004/0081074 A1 * | 4/2004 | Piechocki | 370/206 |
| 2004/0081248 A1 * | 4/2004 | Parolari | 375/259 |
| 2004/0202259 A1 * | 10/2004 | Gross et al. | 375/348 |
| 2005/0025254 A1 | 2/2005 | Awad et al. | |
| 2005/0259567 A1 * | 11/2005 | Webster et al. | 370/208 |

FOREIGN PATENT DOCUMENTS

CN    1232353    10/1999

(Continued)

OTHER PUBLICATIONS

International Search Report—PCT/US05/35461, International Search Authroity—US, Alexandria, Virginia—Jul. 17, 2006.

(Continued)

*Primary Examiner* — Dac Ha
*Assistant Examiner* — Vineeta Panwalkar
(74) *Attorney, Agent, or Firm* — Sayed H. Beladi

(57) ABSTRACT

Methods and apparatus are disclosed herein for providing incremental redundancy in a wireless communication system to aid in error recovery. One or more redundancy versions are sent on different carriers than the primary version of information to be transmitted. At the receiver end the redundancy versions may be combined using hard or soft combining techniques, including selection combining, selective soft combining or soft combining.

28 Claims, 10 Drawing Sheets

FOREIGN PATENT DOCUMENTS

| | | |
|---|---|---|
| CN | 1307760 | 8/2001 |
| CN | 1409907 | 4/2003 |
| JP | 57138237 | 8/1982 |
| JP | 2001251377 | 9/2001 |
| WO | WO2004049617 | 6/2004 |
| WO | WO2005034521 A1 | 4/2005 |

OTHER PUBLICATIONS

Written Opinion—PCT/US05/35461, International Search Authroity—US, Alexandria, Virginia—Jul. 17, 2006.

"ATM Multicast Communication Methods with Multipule QoS Guarantee", NTT R&D, vol. 46, No. 3, pp. 191-198, 1997.

\* cited by examiner

MULTI-CARRIER INCREMENTAL REDUNDANCY FOR PACKET-BASED WIRELESS COMMUNICATIONS

CLAIM OF PRIORITY UNDER 35 U.S.C. §119

This application claims priority to U.S. Provisional Application No. 60/615,254 filed Oct. 1, 2004, entitled "Multi-Carrier Incremental Redundancy for GERAN," and assigned to the assignee hereof and hereby expressly incorporated by reference herein.

BACKGROUND

1. Field

The present invention generally pertains to the field of wireless communications, and more particularly to the field of error recovery in wireless communication systems.

2. Background

Over the past two decades, cellular telephones have become increasingly commonplace. During this same period, a number of advances in wireless technology have afforded cellular telephones with more features, better reception, higher bandwidth and increased system capacity. Today's digital and packet-based wireless systems are considerably more advanced than the first digital wireless systems, and show great promise for the future. GSM (Global System for Mobile Communications) was among the first widespread digital wireless systems. GSM was introduced as a second generation (2G) wireless system throughout Europe in the early 1990s and is now operational in over 100 countries worldwide. Over the years the developers of GSM introduced a number of enhancements and improvements, building on the basic voice services of GSM to add various data and speech capabilities to the system. With these improvements GSM has evolved into a system capable of offering a number of enhanced digital mobile voice and data telephony services such as Internet access, multimedia and video.

The GSM enhancements include GPRS, EDGE and GERAN. GPRS, the General Packet Radio Service first introduced in the mid 1990s, is a TDMA wireless packet-based network architecture based on GSM. GPRS is based on the GSM air interface (i.e., the interface between the terminal and the base station) and on the GSM air interface structure of timeslots and TDMA frames. GPRS offers increased bandwidth to users, and more efficient use of bandwidth for operators in as much slots as may be dynamically allocated between voice and data depending upon the demand conditions. This allows a GPRS link to use from one to eight of the slots available per GSM frame, at up to 22.8 kb/s for each time slot. Further, the number of slots for the GPRS up-link and down-link may be allocated independent of each other. GPRS employs four different coding schemes, CS1 through CS4, each of which is a phase modulation coding scheme using Gaussian minimal shift keying (GMSK) modulation. GPRS supports X.25, the low speed packet transmission protocol popular in Europe. GPRS was implemented as a step towards implementing the EDGE system (Enhanced Data for GSM Evolution). EDGE is an enhancement to GPRS which uses the same spectrum allocations as existing GSM systems (e.g. GSM900, GSM1800 and GSM1900). EDGE features nine coding schemes, four employing GMSK modulation and five employing Eight Phase Shift Keying (8PSK) modulation. The four EDGE GMSK coding schemes, MCS1 through MCS4, are akin to the four GPRS coding schemes (i.e., CS1 through CS4). The other five EDGE coding schemes, MCS5 through MCS9, use 8PSK modulation, producing a three-bit word for every change in carrier phase. The use of 8PSK modulation roughly triples the GPRS peak data rates. Another enhancement to GSM, GERAN (GSM Edge Radio Access Network) supports the EDGE network as an alternative radio access network compatible with the 3G GSM-evolved Core Network (CN). The GERAN architecture allows connection to the A, Gb and Iu interfaces of the CN. GERAN is being implemented to deliver packet-based real time wireless services including speech, multimedia, video and Internet access.

Despite the improvements in coding schemes and enhanced features, from time to time, errors occur in wireless systems due to poor reception conditions. To recover from reception errors, EDGE, and the enhancements and services associated with it, provide an incremental redundancy error recovery scheme. When a transmission fails due to the detection of an error, the mobile receiver sends an automatic repeat request (ARQ) back to the base station. In response to the ARQ, the base station transmits the failed transmission using a different encoding scheme. Error recovery is performed by combining the initial message with the second version of the message retransmitted using a different encoding scheme. This conventional system of error recovery increases the likelihood of recovering a failed message, but results in delays due to the ARQ being sent back to the source of the message with a request to retransmit another version encoded differently.

SUMMARY

In one embodiment, a method of providing redundancy for error recovery in multi-carrier wireless communications is provided. The method comprises encoding a primary version of information to be transmitted with a first encoding scheme and encoding a redundancy version of the information to be transmitted with a second encoding scheme. The method further comprises transmitting the primary version of the information encoded with the first encoding scheme, the primary version being transmitted on a first carrier, and transmitting the redundancy version of the information encoded with the second encoding scheme, at least part of the redundancy version being transmitted on a second carrier. The redundancy version is transmitted in response to transmitting the primary version of the information within a same transmission time period as the primary version.

In another embodiment, a communication device for providing redundancy for error recovery in multi-carrier wireless communications is provided. The device comprises an encoder for encoding a primary version of information to be transmitted with a first encoding scheme, and encoding a redundancy version of the information to be transmitted with a second encoding scheme. The device further comprises a transmitter for transmitting the primary version of the information encoded with the first encoding scheme, the primary version being transmitted on a first carrier, and transmitting the redundancy version of the information encoded with the second encoding scheme, at least part of the redundancy version being transmitted on a second carrier. The redundancy version is transmitted in response to transmitting the primary version of the information within a same transmission time period as the primary version.

In another embodiment, an apparatus for providing redundancy for error recovery in multi-carrier wireless communications is provided. The apparatus comprises means for encoding a primary version of information to be transmitted with a first encoding scheme and means for encoding a redundancy version of the information to be transmitted with a second encoding scheme. The apparatus further comprises means for transmitting the primary version of the information encoded with the first encoding scheme, the primary version being transmitted on a first carrier, and means for transmitting the redundancy version of the information encoded with the second encoding scheme, at least part of the redundancy version being transmitted on a second carrier. The redundancy version is transmitted in response to transmitting the primary version of the information within a same transmission time period as the primary version.

In another embodiment, a computer readable media embodying a method for error recovery in multi-carrier wireless communications is provided. The method comprises encoding a primary version of information to be transmitted with a first encoding scheme and encoding a redundancy version of the information to be transmitted with a second encoding scheme. The method further comprises transmitting the primary version of the information encoded with the first encoding scheme, the primary version being transmitted on a first carrier, and transmitting the redundancy version of the information encoded with the second encoding scheme, at least part of the redundancy version being transmitted on a second carrier. The redundancy version is transmitted in response to transmitting the primary version of the information within a same transmission time period as the primary version.

BRIEF DESCRIPTION OF THE DRAWINGS

The accompanying drawings, which are incorporated in and constitute part of the specification, illustrate various embodiments of the invention, and, together with the general description, serve to explain the principles of the foregoing embodiments.

DETAILED DESCRIPTION

Figure 1A:
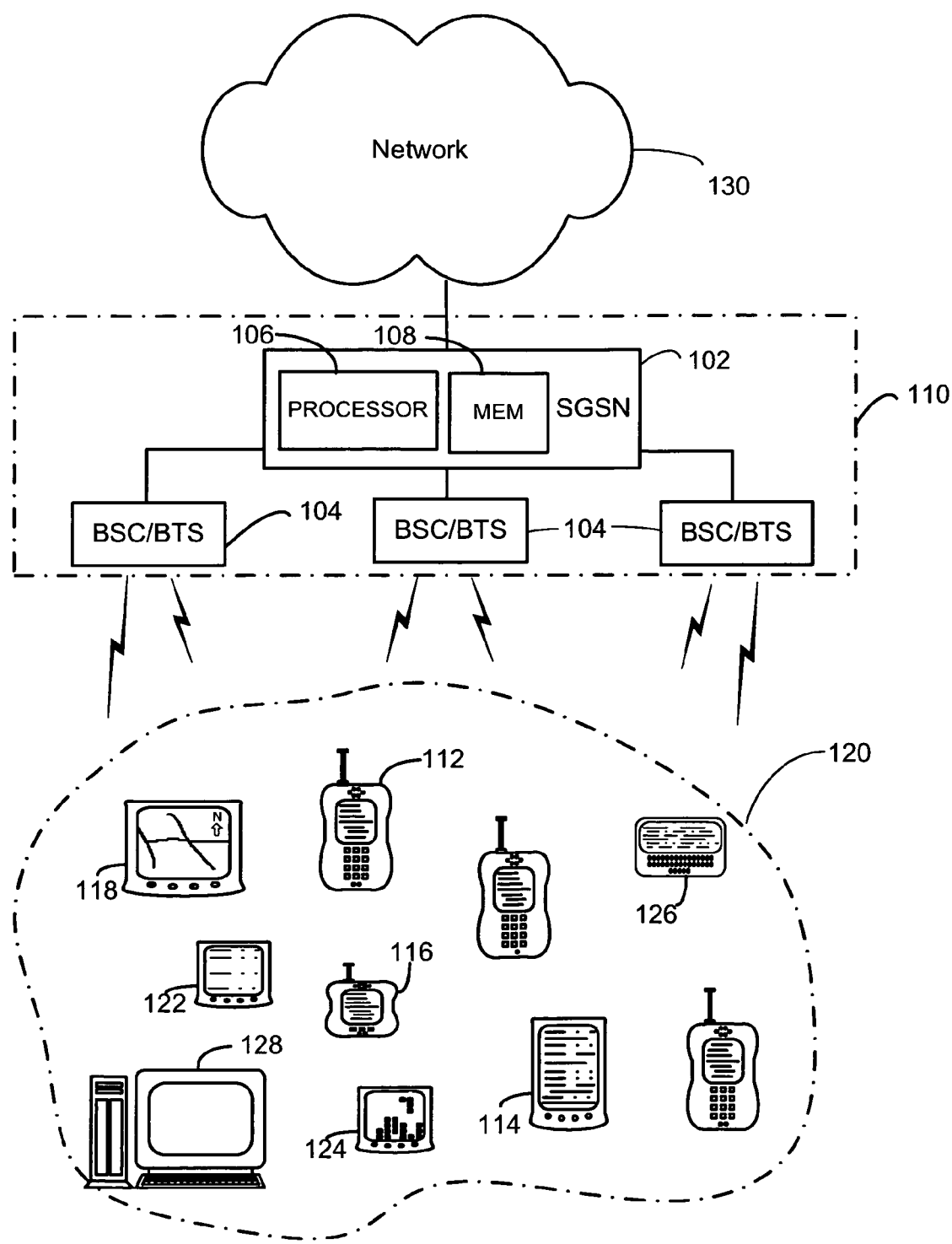
FIG. 1A depicts a wireless network architecture that supports mobile stations and client devices in accordance with at least one embodiment.

FIG. 1A depicts a typical wireless network architecture that supports mobile stations and client devices in accordance with various embodiments. FIG. 1A is a block diagram which illustrates components of a typical wireless network 110, and its interrelation with the elements of an exemplary embodiment. Downstream from the network 130 a wireless system typically has three broad categories of components: the core network controllers (SGSN 102), the base stations (BSC/BTS 104) and wireless mobile units 120. Although the network controller in the figure is labeled as a Serving GPRS Support Node (SGSN) 102, in some implementations it may take other forms or be called other names, for example, a mobile switching center (MSC). Generally, an SGSN is the core network entity dealing with packet-switched connections, while the MSC is the core network entity dealing with circuit-switched connections. Similarly, the figure depicts base station controllers/base transceiver station (BSC/BTS) 104 which may sometimes take other forms or be referred to by other names, for example base station system (BSS). Mobile units 120 are known by many different names, for example, cellular telephones, mobile stations, wireless handsets, pocket bells, etc. The scope of the invention covers these other terms, e.g., MSC, BSS, and the like.

The wireless network shown is merely exemplary and may include any system that allows communication with mobile wireless devices, such as mobile units 120 that communicate over-the-air between and among each other and/or between and among components connected via a wireless network 110. Such mobile units 120 include without limitation one or more cellular telephone 112, PDA (personal digital assistant) 114, pager 116, navigation device 118, wirelessly connected computer 128, music or video content download unit 122, wireless gaming device 124, inventory unit 126, or other like types of wireless devices. Cellular or other wireless telecommunication services may communicate with a carrier network through a data link or other network link via the fixed network 130 which may be the PSTN (public switched telephone network), ISDN, the Internet, a LAN, WAN, or other such network. Signaling between SGSN 102 and the fixed network 130 may be performed using Signaling System Number 7 (SS7) protocol. SS7 is used for trunk signaling in ISDN and widely used in current public networks.

The wireless network 110 controls messages or other information, typically sent as data packets, sent to a SGSN 102. Each SGSN 102 is generally connected to one or more BSC/BTS 104. The SGSN 102 acts within the wireless network 110 in a manner akin to a normal switching node of a landline network (e.g., PSTN or ISDN). SGSN 102 includes the logic, for example in a processor 106, to manage and control the mobile units 120. The processor 106 or other logic manages and controls functions such as call routing, registration, authentication, location updating, handovers and/or encoding schemes for the mobile units 120 registered at the BSC/BTS 104 base stations associated with the SGSN 102. Another piece of a typical wireless network is the Operations and Maintenance Center (OMC), which may be considered part of the processor 106 or other logic. The OMC organizes the operation and setup of the wireless network.

Figure 1B:
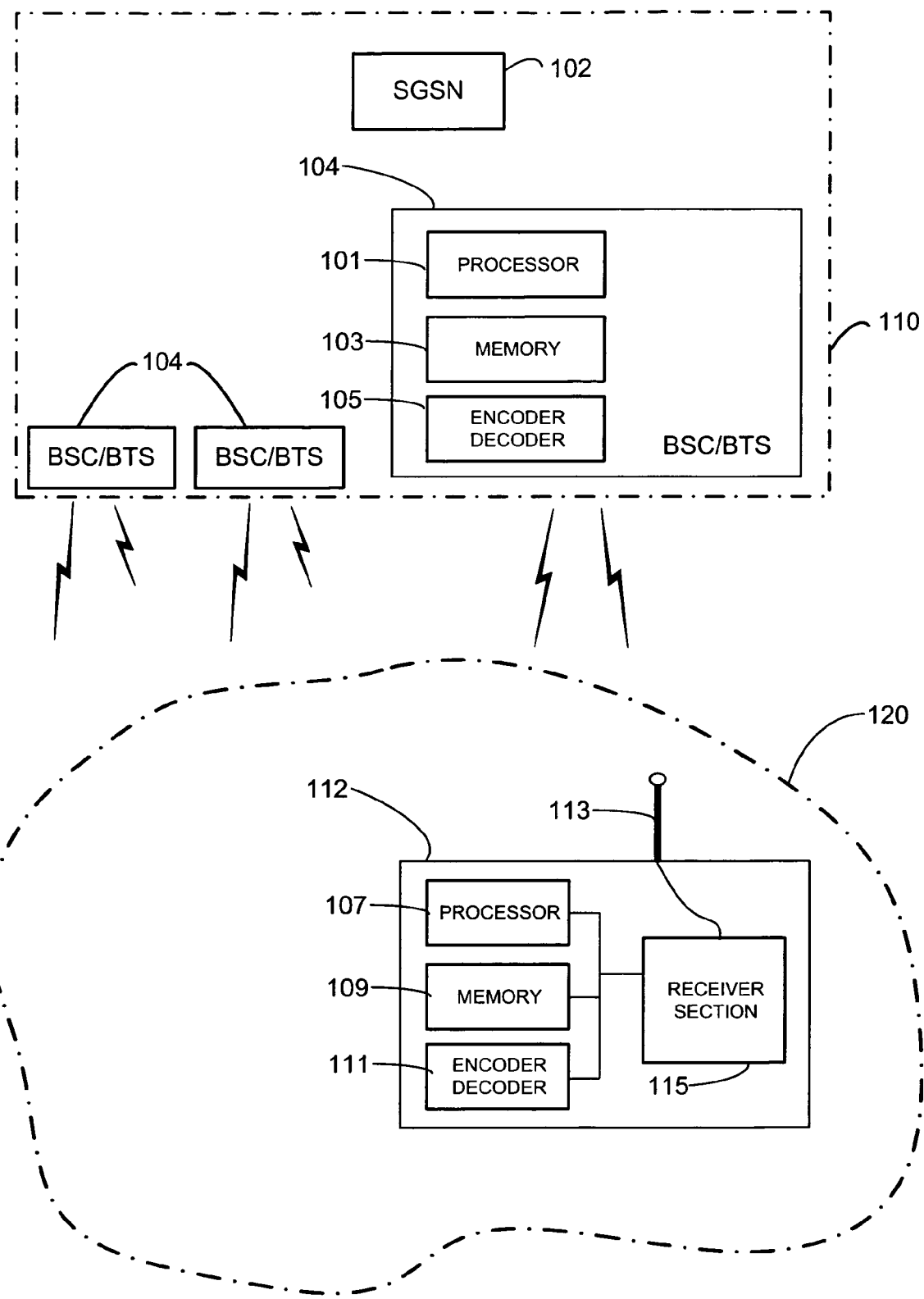
FIG. 1B depicts details of a base station and a wireless mobile unit in a wireless network.

In a similar manner to the network 130, the SGSN 102 is connected to a number of BSC/BTS 104 by a network configured for data transfer and/or voice information. In this way, within the wireless network 110, communications to and from various SGSNs 102 and BSC/BTSs 104 typically use a network of landlines, the Internet and/or a public switched telephone network (PSTN). The base station subsystem, including BSC/BTS 104, controls the radio link with the mobile units 120. Within the base station subsystem, BSC/BTS 104 has one or more transmitters and receivers to send and receive information to/from mobile units 120. BSC/BTS 104 broadcasts data messages or other information wirelessly to the mobile units 120, such as cellular telephone 112, by over-the-air (OTA) methods. The BSC/BTS 104 communicates with mobile units 120 across the Um interface, also known as the air interface or radio link. FIG. 1B depicts details of a BSC/BTS 104 and a wireless mobile 120. Each base station BSC/BTS 104 includes an encoder/decoder 105 which encodes/decodes information in the protocol or encoding scheme for transmission/reception. The base station BSC/BTS 104 also includes a processor 101 capable of performing or controlling routines and processes involved in wireless communications, and may also be configured to include a memory 103 for storing the various protocols, routines, processes or software to be used in conducting wireless communications. For example, the memory 103 may store one or more transmission strategies for communicating with various mobile units 120. The transmission strategies include information concerning the number of redundancy versions to be sent, the timing for transmitting the redundancy version (or versions) relative to the primary version, and any encoding schemes or protocols to be used for the transmission and reception of wireless communications. This information may also be stored in a memory 108 of the SGSN 102, and communicated to the base station BSC/BTS 104 as needed. Embodiments of the mobile units 120, as can be seen in the detail of cellular telephone 112 shown in FIG. 1B, may be configured to include a processor 107, memory 109 and encoder/decoder 111 which perform functions similar to the corresponding parts of the BSC/BTS 104. Mobile units 120 may also have an antenna 113, a receiver section 115 and other electronics known to those of ordinary skill in the art for wirelessly receiving information which may entail monitoring for, and receiving, transmissions sent simultaneously or overlapping on different carriers in a multi-carrier wireless system.

The wireless network 110 includes at least one Home Location Register (HLR) and a number of Visitor Location Registers (VLRs) (not shown) which provide information for call-routing and roaming. The HLR, typically centralized within wireless network 110, contains the administrative information for each mobile unit 120 registered in the wireless network 110, along with the current location of the mobile unit 120. The HLR could be implemented as a distributed database, although there is logically only one HLR per network. Each SGSN 102 of the wireless network 110 has associated with it a Visitor Location Register (VLR) stored in the memory 108 of the SGSN/MSC 102. The VLR stores selected administrative information from the centralized HLR for use in call control and the provisioning of the subscriber services for each mobile unit 120 currently under control of the SGSN/MSC 102. There are generally two other registers used for authentication and security in a wireless network 110, an Equipment Identity Register (EIR) and an Authentication Center (AuC). The EIR is a database of all valid mobile units 120 associated with the network. The mobile units 120 are identified within the EIR by their unique International Mobile Equipment Identity (IMEI). The AuC contains copies of the secret key stored in each mobile unit 120 for use in authentication and encryption over the radio channel. It should be noted that the SGSN/MSC 102 itself does not contain the information about particular mobile units 120. The mobile unit 120 information is typically stored within the HLR and VLRs.

Mobile units 120 are generally equipped with a Subscriber Identity Module (SIM), a smart card that identifies the mobile unit 120 enabling it to make and receive calls at that terminal and receive other subscribed services. The IMEI of the wireless unit 120 stored on the SIM card uniquely identifies that particular mobile unit 120. The SIM card also has stored on it an International Mobile Subscriber Identity (IMSI) used to identify the subscriber to the system, along with a copy of the secret key from the AuC register for authentication, and other information pertaining to security, identification and communication protocols. Each mobile unit 120 has installed on it, or otherwise downloads, one or more software applications, such as games, news, stock monitors, and the like. The mobile unit 120 includes logic which may be configured in the form of one or more processing circuits executing resident configured logic, microprocessors, digital signal processors (DSPs), microcontrollers, or other like combination of hardware, software and/or firmware containing processors and logic configured to at least perform the operations described herein.

The wireless communication between each of the mobile units 120 and the BSC/BTS 104 may be based on any of several different technologies, such as CDMA (code division multiple access), TDMA, FDMA (frequency division multiplexed access), OFDM (orthogonal frequency division multiplexing) and any systems using a hybrid of coding technologies such as GSM, or other like wireless protocols used in communications or data networks, so long as the system or protocol provides simultaneous multi-channel (e.g., multi-carrier) communications. A carrier may be thought of as a particular frequency (or frequency band) at a given point in time. The concept of a channel encompasses a carrier, but may be more broadly thought of to include spatial diversity (e.g., different communication links) or other like type of communication paths which may be simultaneously received by a receiver. Data communication typically takes place between the mobile unit 120, BSC/BTS 104 and SGSN 102. The SGSN 102 may be connected to multiple data networks such as a carrier network, PSTN, the Internet, a virtual private network, and the like, thus allowing the client device access to a broader communication network. As discussed in the foregoing, in addition to voice transmission, data may be transmitted to the client device via SMS or other OTA methods known in the art.

Figure 2A:
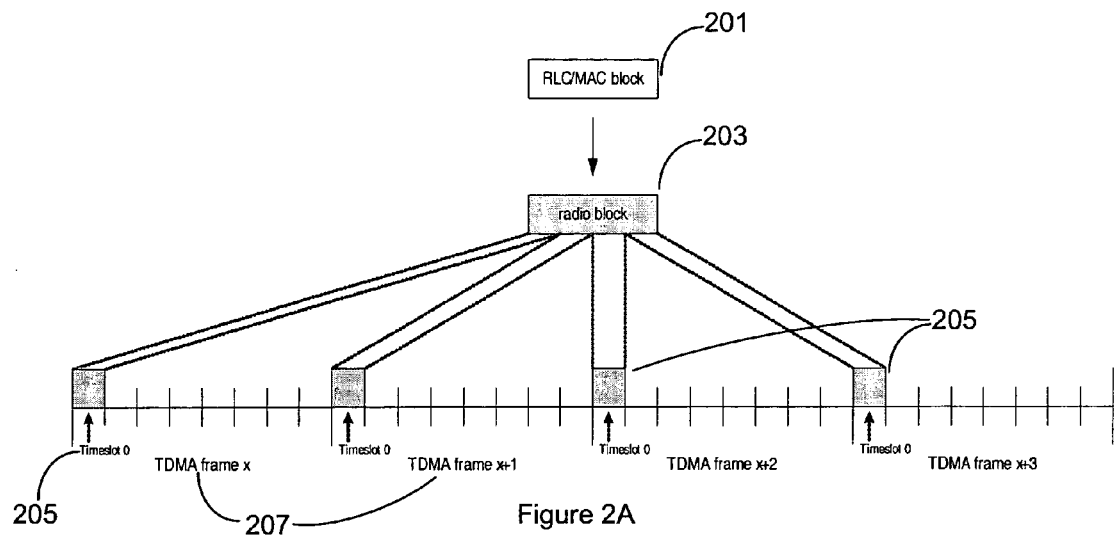
FIG. 2A depicts an RLC/MAC block of information being allocated into a GSM structure of timeslots and frames.

FIG. 2A depicts an RLC/MAC block of information being allocated into a structure of timeslots and frames. GSM is used herein as an exemplary system to explain the RLC/MAC concepts and frame structure. Embodiments of the invention may be incorporated in other wireless systems as well. GSM allocates its available radio spectrum using such a scheme which combines aspects of TDMA (Time Division Multiple Access) and FDMA (Frequency Division Multiple Access). GSM uses FDMA concepts to divide its available bandwidth carrier frequencies spaced 200 kHz apart. Typically, each base station has several of these carrier frequencies assigned to it. Time division, a TDMA concept, is achieved in GSM by having each of the carrier frequencies divided into timeslots 205 as shown in FIG. 2A. GSM timeslots last $15/26$ ms (0.577 ms). The terms "timeslots" and "burst periods" may be used interchangeably. There are eight 0.577 ms timeslots 205 in each GSM TDMA frame 207 lasting 4.615 ms. A GSM physical channel may be thought of as one timeslot 205 per TDMA frame 207. For example, a physical channel could consist of the timeslot "0" (205) in each of the sequence of TDMA frames "x" through "x+3" (207) shown in FIG. 2A. A wireless link on a channel may occupy the same timeslot 205 (e.g., timeslot 0) within each of a series of TDMA frames 207, for the duration of the link or at least until a new channel is assigned. Channels may either be dedicated channels allocated to a particular mobile station for a call, or may be common channels used by a number of mobile stations in idle mode on an as-needed basis.

In the GSM system, the framing scheme may be set up in different ways according to the function being carried out. One such channel is full rate GSM traffic channels (TCH). TCH carry speech and data traffic and may be grouped in multiframes consisting of 26 frames. That is, each TCH multiframe includes 26 TDMA frames. (Multiframes may be defined to contain different numbers of frames aside from 26 frames; e.g., 52 frame multiframes.) Each 26-frame multiframe is 120 ms long (120 ms/26=4.615 ms=one frame). Hence, one multiframe (120 ms) divided by 26 frames divided by eight burst periods per frame, is equal to one burst period (timeslot) of approximately 0.577 ms. The 26 frames in a GSM multiframe include 24 traffic frames, one frame dedicated to the Slow Associated Control Channel (SACCH), and another frame which, at the present time, remains undefined and is not used. In order to afford some time between when a mobile station is transmitting and when it is receiving, uplink TCHs and downlink TCHs are separated in time by three burst periods. In addition to full-rate TCHs (TCH/F), there are half-rate TCHs (TCH/H). There are also eighth rate TCHs, sometimes called Stand-alone Dedicated Control Channels (SDCCH), which are used mainly for transmitting location updating information. The use of half-rate TCHs effectively doubles the system capacity as compared to communications using full-rate THCs since TCH/H speech coding is performed at 7 kbps rather than 13 kbps for full rate TCH/F.

FIG. 2A shows an RLC/MAC 201 block mapped onto one radio block 203 and then onto four timeslots 205 belonging to four sequential TDMA frames 207 of a GSM multiframe. The Layer 2 transmission protocol of GPRS/EDGE is RLC/MAC. RLC (Radio Link Control) is a sublayer of the radio interface that provides reliability, and MAC (Medium Access Control) is the lower of the two sublayers of the Data Link Layer and handles access to a shared medium. RLC/MAC provides the control and coordination necessary for GPRS wireless communications. In GPRS, one RLC/MAC 201 block is transmitted as part of one radio block 203. The radio block 203 is sent via four consecutive GPRS timeslots 205, which are transmitted on a GPRS timeslot multiframe, for example, a 24 timeslot multiframe as described above or possibly a 52 timeslot multiframe. The inter-timeslot distance between each of the four timeslots 205 containing the radio block is eight timeslots, or the length of one TDMA frame 207. The content of the four timeslots 205 is simply the sequence of the four portions of the RLC/MAC 201 block itself. Since GPRS does not provide any incremental redundancy for error recovery, there is no incremental redundancy relationship among the four timeslots 205, and they do not contain any redundant information of the radio block data 203. However, an incremental redundancy scheme is provided in EDGE in which redundancy versions are sent at different points in time on the same carrier.

Figure 2B:
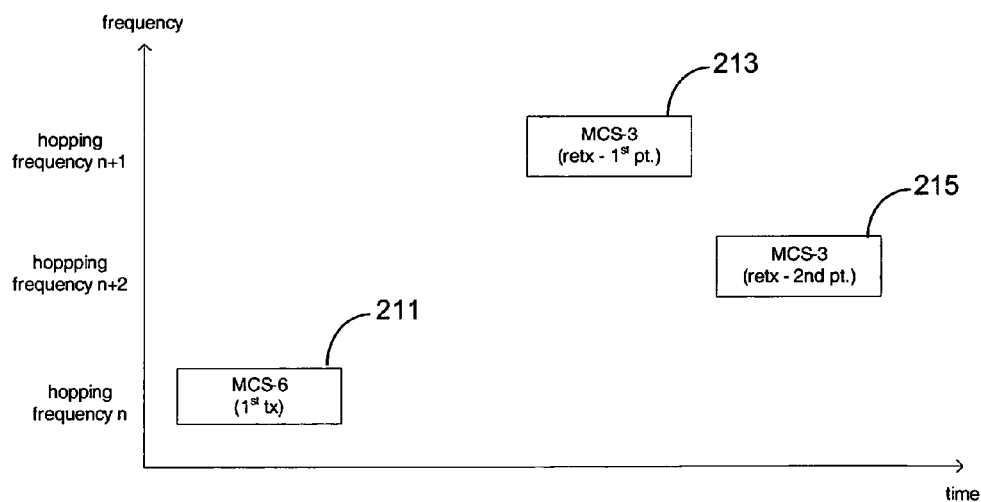
FIG. 2B illustrates an exemplary incremental redundancy scheme.

FIG. 2B illustrates an exemplary incremental redundancy scheme. Incremental Redundancy may be employed in EDGE within the RLC/MAC protocol, at Layer 2. If no errors are detected in an RLC/MAC block that is sent to a mobile station, the RLC/MAC block is passed to the next layer for processing. For example, if no errors had been detected in the first transmission 211 of FIG. 2B (an RLC/MAC block encoded with MCS-6) it would have been passed to the next layer with no retransmissions, and retransmission blocks 213 and 215 would not have been sent. In the present EDGE implementation, for a negatively acknowledged RLC/MAC block in which an error is detected the mobile sends an automatic repeat request (ARQ) back to the base station. In response to the ARQ, the base station retransmits the RLC/MAC block using a different MCS (Modulation and Coding Scheme). The retransmitted block(s) are typically recombined with the first block, thus enhancing the redundancy and increasing the chances of recovering the RLC/MAC block free of errors. This situation is depicted in FIG. 2B assuming an error was detected in the first transmission block 211 resulting in an ARQ being sent back to the base station. In response to the ARQ the same information was sent again in retransmission blocks 213 and 215, this time encoded in MCS-3. Since a different modulation and coding scheme was used for the retransmission (MCS-3) versus the first transmission (MCS-6), it took two retransmission blocks instead of one to communicate the data. The retransmission, in this example, used the first retransmission part 213 and the second retransmission part 215 to communicate the data.

Most embodiments of the invention encode the redundancy versions using a different encoding scheme (e.g., a different MCS) than that of the primary version. This provides incremental redundancy rather than merely providing redundancy by sending redundant versions encoded in the same scheme. However, some embodiments of the invention may encode the redundancy version using the same MCS if it is likely that errors arose due to reception conditions associated with a particular carrier. Conventional implementations of EDGE do not retransmit a negatively acknowledged RLC/MAC block using the same MCS as the original transmission because errors caused by prevailing adverse conditions of the air interface would most likely produce a similar result containing errors since conventional implementations of EDGE send redundancy versions using the same carrier as the primary version.

When a different MCS is employed for redundancy versions, there are some constraints regarding the choice of encoding schemes. MCS coding schemes are categorized within families (e.g., family A, B or C). If a different MCS is used for a redundancy version, it should be chosen from the same "family" of the MCS used in the first transmission. For example, FIG. 2B depicts a negatively acknowledged MCS-6 RLC/MAC block 211 being retransmitted using two MCS-3 blocks 213 and 215. This is appropriate since MCS-6 and MCS-3 both belong to Family A. Additionally, when a lower MCS is used, the retransmitted RLC/MAC blocks may need more radio blocks than the first transmission since the same information is to be retransmitted with a lower code rate. This is depicted in FIG. 2B, which shows that the first transmission 211 being sent with MCS-6 in one radio block needs two radio blocks 213 and 215 due to the retransmission being performed with MCS-3.

As shown in FIG. 2B, the interval between the first MCS-6 transmission 211 and the first MCS-3 transmission 213 is larger than the interval between the two MCS-3 transmissions 213 and 215. In a conventional incremental redundancy implementation for EDGE, which sends the redundancy versions on the same carrier, this time interval before transmission of the redundancy version is due to the negative acknowledgement process in EDGE; e.g., an ARQ being sent back to the base station. The negative acknowledgement process in EDGE is RLC-based and therefore relatively time-consuming. Following the failure of the first transmission 211 in a conventional EDGE incremental redundancy implementation, an acknowledgement signal (not shown) needs to be sent back to the sender before beginning the retransmissions. The duration of this interval is implementation-dependent and is based on the RLC/MAC settings. Embodiments of the invention are not limited in this way, since there is not necessarily a requirement for an ARQ. Instead, the redundancy versions are transmitted as part of a predefined scheme (e.g., in response to the primary version be transmitted, encoded or otherwise processed) rather than being sent in response to the ARQ. In some embodiments, the redundancy version may be sent according to a predefined transmission strategy within the same transmission time period as the primary version, but not necessarily at the same time. For the purposes of timing the transmissions of primary and redundancy versions, a transmission time period is defined herein as any time after the transmission of the primary version begins up until the start of the next primary version, assuming the next primary version is not delayed due to a reception error. In other embodiments, the transmission time period may be defined as a predefined value that is less than the time it takes an ARQ signal to be received back at the transmitter following a reception error. A transmission strategy is defined as a predefined plan for the number of redundancy versions to be sent, the timing for sending the redundancy version(s) relative to the primary version, and the encoding schemes to be used for the primary version and the one or more redundancy versions. While some embodiments send redundancy versions following the primary version but within the same transmission time period as the primary version, other embodiments send the redundancy versions simultaneous to the primary version, as discussed in conjunction with FIGS. 3-4 and 6.

Figure 3:
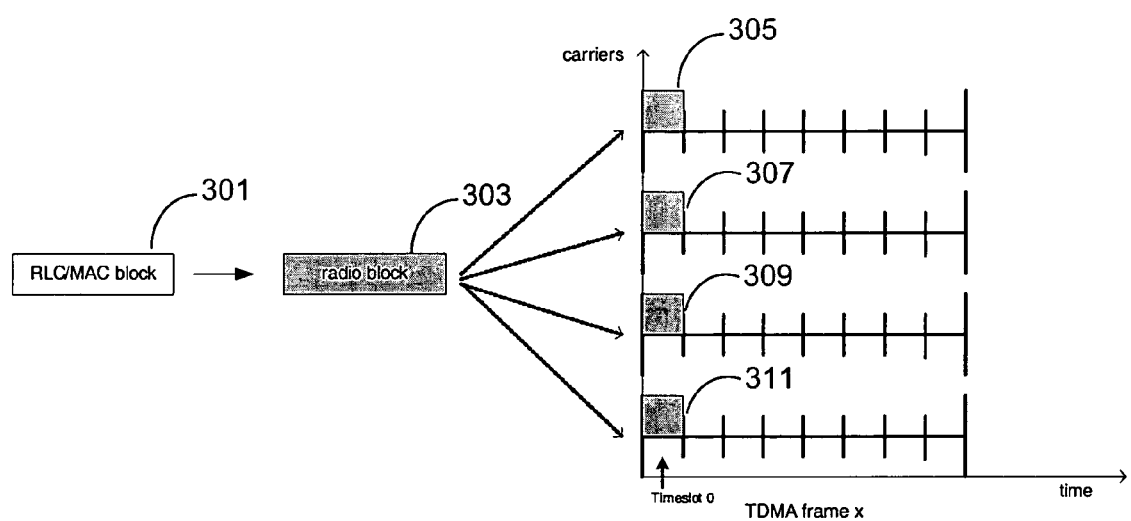
FIG. 3 depicts a radio block being transmitted via a multi-carrier transmission system in accordance with at least one embodiment.

FIG. 3 depicts a radio block 303 being transmitted via a multi-carrier transmission system in accordance with the invention. This figure is typical of embodiments of the present invention which include enhanced incremental redundancy error recovery for GERAN or other wireless systems based on a multi-carrier architecture and on the introduction of OFDM (orthogonal frequency division multiplexing). A number of multi-carrier wireless transmission systems exist which may be used with the invention, including various formats of multi-carrier CDMA, spread spectrum communications systems, or OFDM. Other such communication systems may be used so long as they are characterized by the use of simultaneous multiple channels; e.g., multi-carrier systems such as Multi-Carrier GPRS (MC-GPRS). The invention allows such multi-channel (e.g., multi-carrier) architectures to be exploited to realize improvements in the transmission structure, for instance, to improve the MC-GPRS transmission structure. An embodiment is depicted in FIG. 3 showing an RLC/MAC block 301 being mapped onto one radio block 303 and then onto four timeslots 305-311 belonging to four parallel TDMA frames in four parallel carriers. A mobile terminal is able to receive the radio block 303 by monitoring all four carriers as it awaits the transmission of the RLC/MAC block.

In an EDGE system, every radio block is sent on a different frequency (frequency hopping system), but terminals in conventional EDGE implementations are required to monitor only one frequency at any given point in time.

In accordance with the invention, radio blocks may be wirelessly transmitted via a multi-carrier transmission system to the reduced transmission time, since a radio block may be transmitted in a single duration, e.g., a single timeslot group of closely spaced or contiguous timeslots. Accordingly, the transmission time for a given amount of data using embodiments of the invention is considerably faster than that of the conventional GPRS transmission structure depicted in FIG. 2A. Comparing the embodiment shown in FIG. 3 with that depicted in FIG. 2A, a radio block in the multi-carrier system may be transmitted in parallel over several carriers as illustrated in FIG. 3. In contrast, the conventional system spreads the radio block over the duration of three TDMA frames (actually, three TDMA frames plus one timeslot, or 25 timeslots) as illustrated in FIG. 2A. Further, using embodiments of the invention the peak transmission rate may be quadrupled in the multi-carrier system since four carriers are used in parallel in this example, as opposed to the use of a single carrier in the GPRS transmission structure of FIG. 2A.

The implementation of multi-carrier transmission for radio blocks is transparent with respect to the upper layers in as much as embodiments of the invention do not impact SNDCP (sub network dependent convergence protocol), LLC (logical link control) and the RLC (radio link control) transmission parameters (e.g., window, etc.). However, the MAC (medium access control) may be affected by the embodiments using multi-carrier transmission. The timeslot and timing structure of the GSM air interface does not need to be modified. Hence, the multi-carrier redundancy improvement embodiments may be easier to introduce than a simple multi-carrier option where four RLC/MAC streams are sent in parallel on four parallel carriers, with each of these streams still being transmitted in GSM according to a GPRS protocol, for example, GPRS R99. Using four parallel RLC/MAC streams per GPRS R99 introduces more complications to the RLC protocol, as the four streams could result in unpredictable behaviors for the window size and the sequence number space at the receiver side.

Incremental redundancy schemes according to at least some embodiments may be implemented by transmitting different redundancy versions of the same information block. By combining the different versions, the receiver may improve the probability of error recovery for correct reception. The various redundancy versions may differ in the modulation, coding or puncturing scheme. However, redundancy versions and the primary transmission, or primary version, are typically chosen from the same family of coding schemes. By way of explanation, MCS coding schemes are categorized within families (e.g., Family A (MCS-3, MCS-6 and MCS-9); Family B (MCS-2, MCS-5 and MCS-7); and Family C (MCS-1 and MCS-4)). The primary version and the redundancy versions should belong to the same MCS "family." For example, if the primary transmission is coded as MCS-7, a Family B coding scheme, the redundancy versions should also belong to Family B; e.g., MCS-2 or MCS-5.

Figure 4:
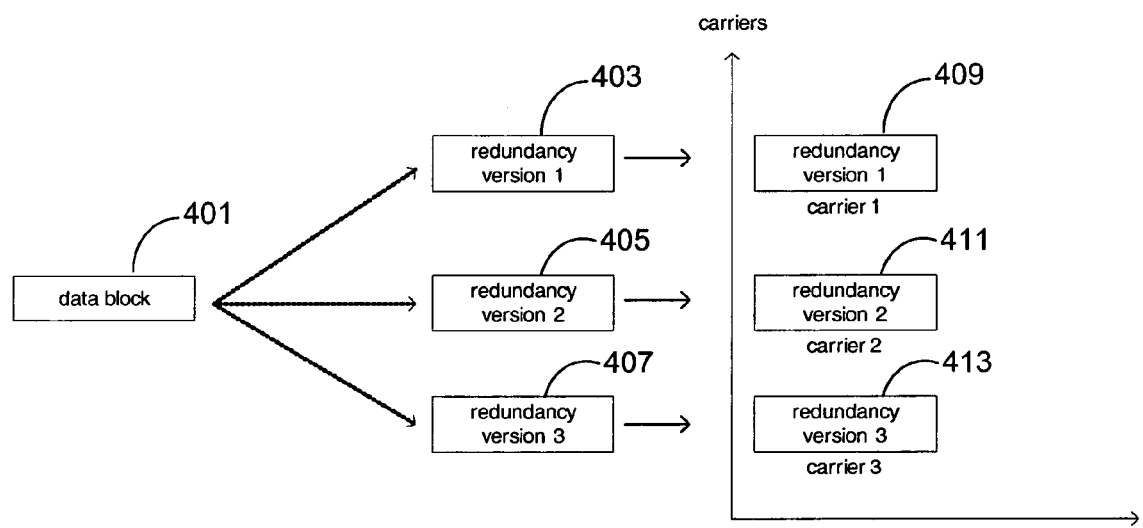
FIG. 4 is a multi-carrier system implementing an incremental redundancy scheme in accordance with at least one embodiment.

FIG. 4 depicts a multi-carrier system implementing a redundancy scheme according to at least some embodiments of the invention. As shown in the figure, a multi-carrier architecture allows a different technique to be employed for the transmission of the different redundancy versions on each of the carriers. This enables various redundancy versions to be sent simultaneously using different carriers; e.g., different frequencies. Alternatively, in some embodiments, the various redundancy versions may be sent at nearly the same time, but not necessarily simultaneously. For example, the various redundancy versions may be sent within the same transmission time period (i.e., at any time after the transmission of the primary version begins up until the start of the next primary version). In some implementations (e.g., some embodiments in a GSM system), a transmission time period may be equal to the time duration of a frame.

The data block 401 is encoded in three different redundancy versions, 403, 405 and 407. As shown in FIG. 4, each of the three different redundancy versions 403-407 is transmitted on its own respective carrier 409-413 in parallel, that is, at approximately the same time. Although each of versions 409-413 is labeled in the figure as a "redundancy version," logically one of them may be considered the "primary version" with the other two being considered redundancy versions of the primary version. Other embodiments may encode any number of different redundancy versions to be sent simultaneously or at least within the same transmission time period, e.g., two redundancy versions, three, four, etc.

Errors in wireless transmission due to fading tend to correlate to particular frequencies for a given set of circumstances. Fading over wireless links tends to be frequency-selective, so different transmissions sent on different carriers will likely experience different amounts of attenuation. Use of embodiments to simultaneously send multiple redundancy versions over different carriers provides for frequency diversity in the multi-carrier system of FIG. 4, instead of merely providing time diversity, as per the conventional system of FIG. 2B. In some situations, errors may be more likely to occur in a particular frequency range due to fading. In accordance with alternative embodiments of the invention, if the primary version is being sent at a frequency known to be prone to fading, a redundancy version sent at a frequency not prone to fading may be encoded with the same coding scheme as the primary version (e.g., primary version subject to fading=MCS-6 and redundancy version not subject to fading=MCS-6 also). This embodiment runs contrary to the general rule-of-thumb of encoding the redundancy versions using differing coding schemes from the same family. Since the coding of different redundancy versions is the same, this embodiment is considered to merely provide redundancy rather than incremental redundancy.

A multi-carrier incremental redundancy scheme according to the invention may be implemented in any of several embodiments tailored to suit the particular needs of an operator, or even tailored to suit a given situation. For example, using self decodable redundancy versions enable various embodiments to be implemented using either selection combining, soft combining, or selective soft combining. Selection combining is the process of having the receiver use only the one redundancy version that has been selected for use. Soft combining is the process of combining all the transmitted/received redundancy versions, using a statistical algorithm or other means, for use in error recovery. Selective soft combining is when some redundancy versions are combined while others are discarded. The choice of which redundancy version (s) to use may be implemented according to prearranged decision making rules. One such rule is to select the first redundancy version for combining (if an error was initially detected) and then error check the transmitted information. The first redundancy version (i.e., the first version to be decoded) could for example be sent on an anchor carrier, the anchor carrier being the main carrier of a multi-carrier structure. If an error is still detected, then the first two redundancy versions are combined with the primary version, and another round of error checking is completed. Further redundancy versions are added as needed (and as available), so long as errors continue to be detected. A receiver may be configured with the logic to implement one or more of selection combining, soft combining or selective soft combining, depending upon the circumstances and parameters affecting the transmission/reception; e.g., carrier-to-interference ratio (C/I), air interface characteristics, noise conditions, atmospheric or other interference conditions, jamming, allowable transmission power, or other like circumstances and parameters affecting the signal reception (or transmission at the other end). The decision may be based on the measured C/I or other parameters affecting a particular one or more of the carriers. The decision of whether to use selection combining, soft combining or selective soft combining may be affected solely by an algorithm, a measurement or logic within the receiver. Alternatively, the decision may be controlled at the transmitter end and communicated to the receiver, or may be controlled at any intermediate point; e.g., BSC/BTS, SGSN/MSC, within the PSTN, or other intermediate point between the two ends of the overall communication link.

Figure 5:
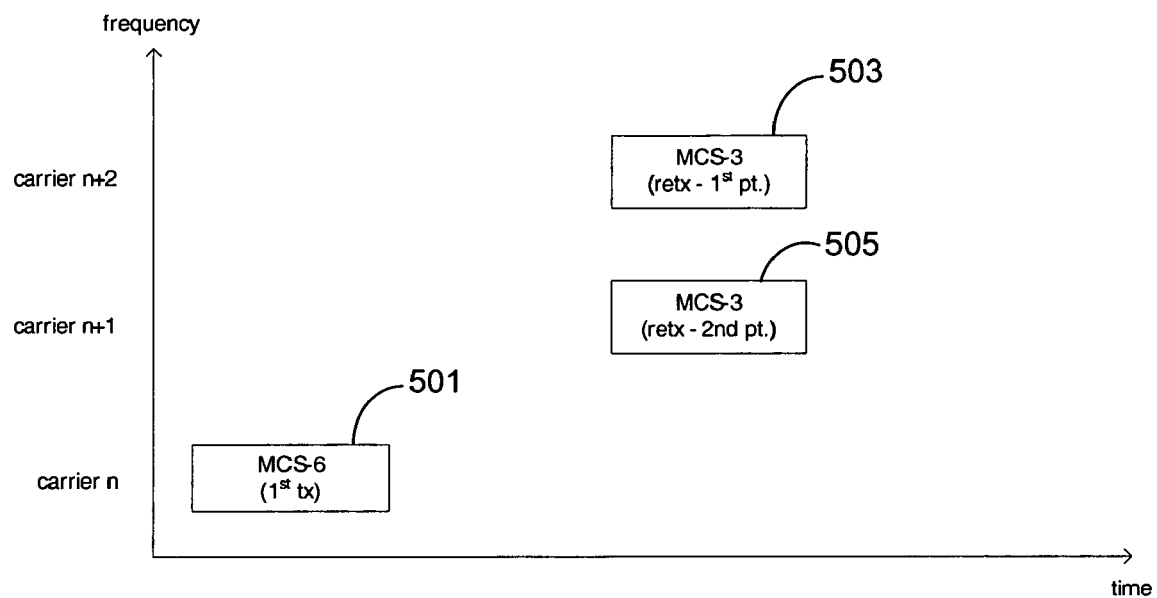
FIG. 5 depicts incremental redundancy in accordance with at least one embodiment in EDGE with variable time-frequency spreading.

FIG. 5 depicts incremental redundancy according to at least one embodiment of the invention in EDGE with variable time-frequency spreading. In conventional implementations of the EDGE system, a retransmission of the same information block due to an error takes a different time duration for the actual transmission itself than that of the original transmission whenever a different MCS coding scheme is chosen for the retransmission. For example, the transmission time of the first transmission 211 at (MCS-6) (shown in FIG. 2B) is shorter in duration than that of the sum of the first and second retransmissions 213 and 215 (at MCS-3), which contain the same amount of information encoded with a different encoding scheme. Embodiments of the present invention may overcome this disadvantage. Accordingly, after a first transmission performed with one MCS-6 radio block 501, the retransmission with two MCS-3 radio blocks may be performed within a time duration no greater in length than the first transmission.

As shown in FIG. 5, embodiments of the present invention may exploit a multi-carrier architecture by sending the redundancy versions via two MCS-3 retransmissions, first retransmission part 503 and second retransmission part 505, using two separate carriers, carrier n+2 and carrier n+1, respectively. Rather than taking a longer time duration for the actual transmission of the redundancy versions, embodiments of the present invention use multiple carriers to send 503 and 505 in parallel. The mapping of MCS to number/location of carriers may either be prearranged or determined by an algorithm, or may be specified in a look-up table.

As is evident from FIG. 5, the two retransmitted blocks 503 and 505 may be transmitted and received in parallel. For implementations in which it is not known at the terminal whether the transmission will take place over one carrier, or two or more carriers, the mobile terminal preferably monitors the parallel carriers continuously. For example, a mobile terminal may monitor the two or more carriers on which the retransmission will be sent in addition to monitoring the original carrier. Having the mobile terminal monitor the parallel carriers continuously allows embodiments of the invention to avoid the need for an out-of-band control channel (as is required in HSDPA or 1x EV-DV) indicating when transmissions and retransmissions are to take place. However, in alternative embodiments of the invention, an out-of-band control channel may be used to provide carrier mapping for the redundancy versions, or the mapping could be encoded as part of a first sent redundancy version (or portion thereof) for all subsequent redundancy transmissions.

Figure 6:
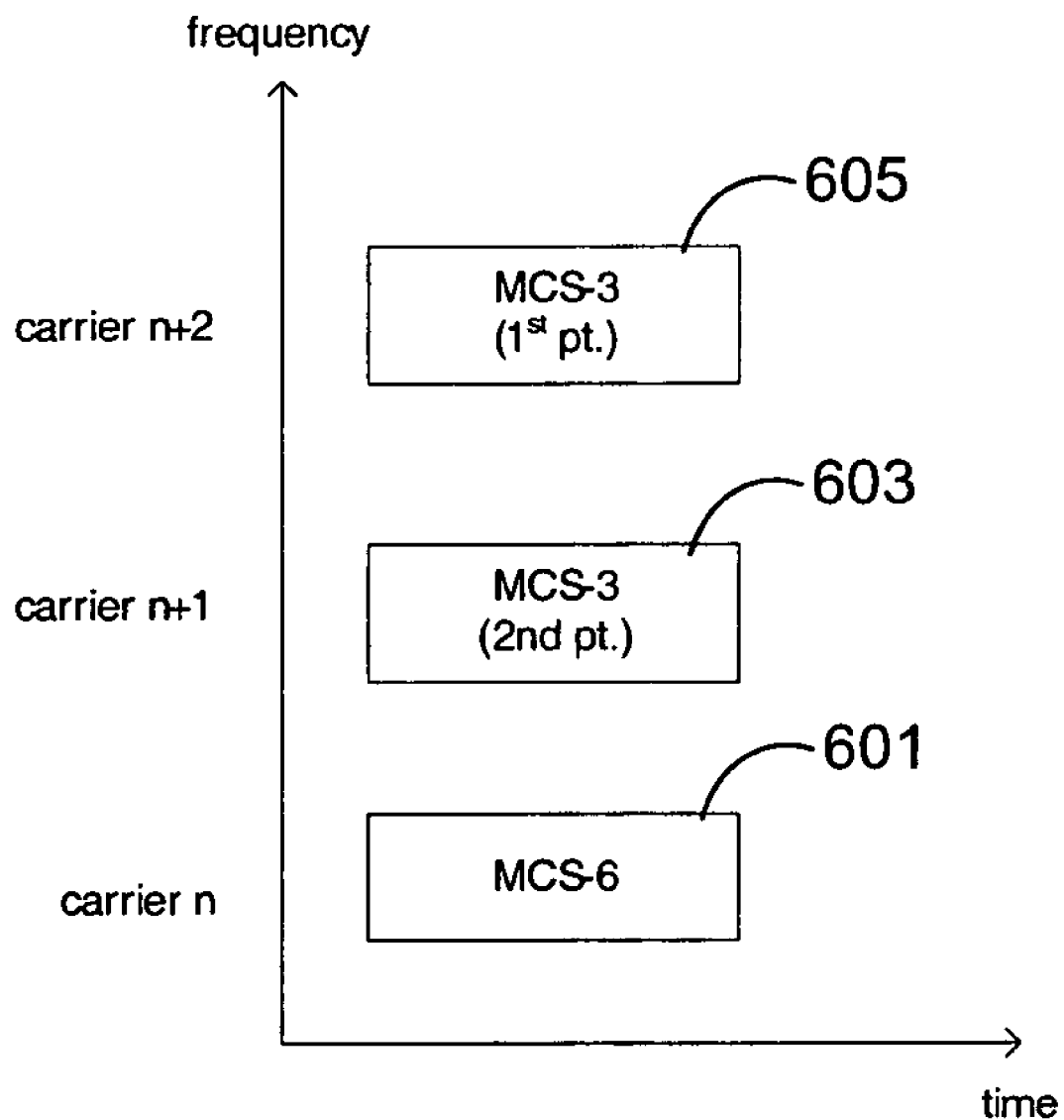
FIG. 6 depicts a multi-carrier, multi-redundancy in accordance with at least one embodiment which provides redundancy for error recovery purposes.

FIG. 6 depicts a multi-carrier, multi-redundancy embodiment, which provides redundancy for error recovery purposes. In the example shown, the primary version 601 containing information encoded using MCS-6 is sent in parallel with two other MCS-3 transmissions 603 and 605 containing the same information which serve as the redundancy version for the primary version 601. Other encoding schemes besides MCS-3 and MCS-6 may be used, as is known to those of ordinary skill in the art. The embodiment depicted in the figure may be used to provide incremental redundancy for EDGE or for other like wireless services or systems. Such embodiments are configured to exploit the multi-carrier architecture by transmitting different redundancy versions simultaneously and in parallel over different carriers. In EDGE systems, backward compatibility is achieved by maintaining the same RLC/MAC architecture as is used in GSM, that is, blocks belonging to the same "family" are sent in parallel. In this embodiment, the various redundancy versions may be transmitted via a different number of carriers in a multi-carrier wireless system. For example, as discussed above, the same amount of information in the form of different redundancy versions may be sent with one MCS-9 radio block, two MCS-6 radio blocks, and four MCS-3 radio blocks—thus entailing the use of one, two, and four parallel carriers, respectively. MCS-9, MCS-6 and MCS-3 are from the same family and have a 1-2-4 code rate relationship. Alternatively, redundancy versions may be encoded from different MCS families, so long as bit stuffing is used to offset the differing block size of separate MCS families.

A receiver according to embodiments of the invention may perform any of selection combining, soft combining, or hard and soft combining. For example, the case where the same information is sent with MCS-6 and MCS-3 entails the transmission of three parallel radio blocks over three carriers: one for MCS-6 and two for the two MCS-3 radio blocks. Here, twice as many MCS-3 radio blocks are needed since the code rate is halved. A receiver may exploit this multi-carrier architecture as long as it receives a subset of the transmitted blocks, for example, if any two blocks out of the transmitted three are received.

Embodiments of the present invention allow for reduced latency, increased peak rate, and improved coverage. Since the receiver may perform combining of the blocks sent in parallel over the multiple carriers, the same performance may be achieved with a lower C/I since the instantaneous code rate is smaller. In general, to fully exploit the capability of EDGE high values of C/I are needed.

Figure 7:
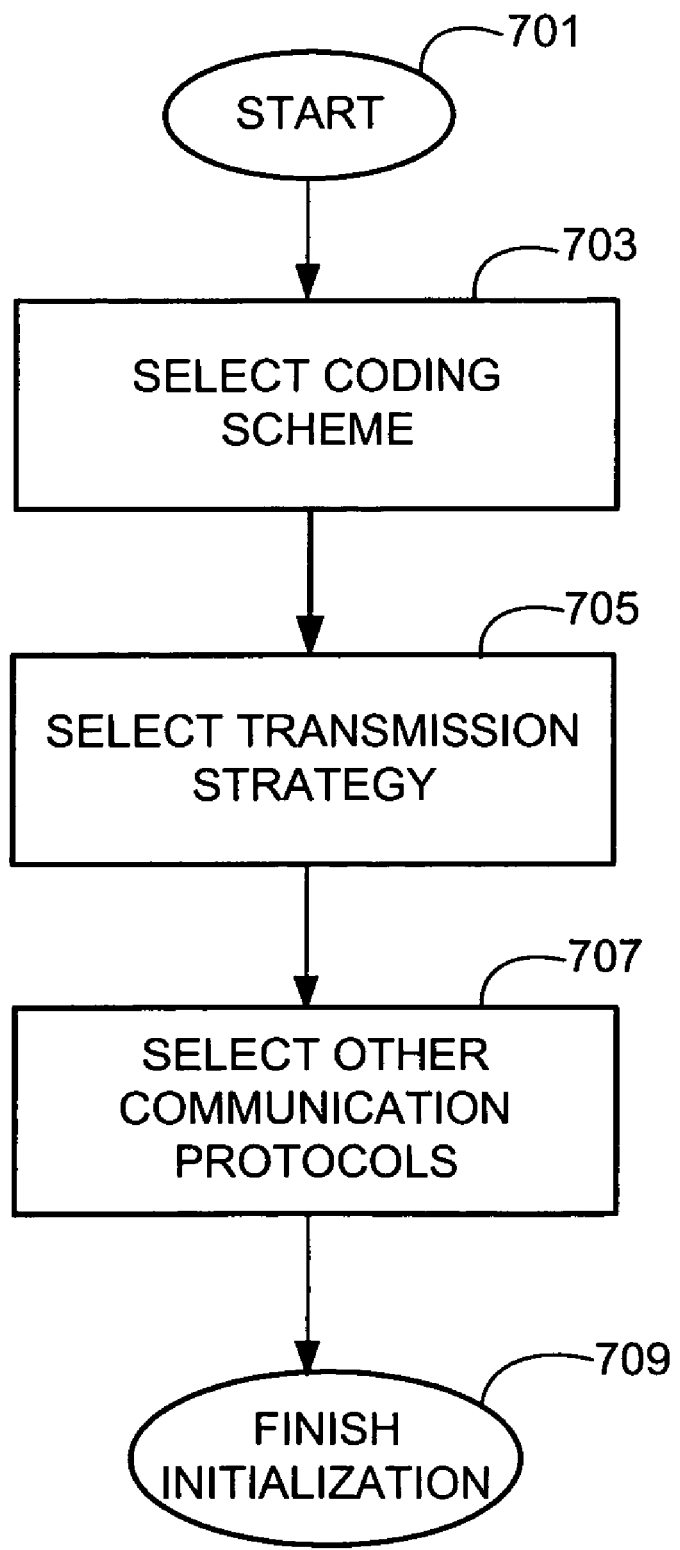
FIG. 7 depicts a method of setting up the initial parameters for practicing at least one embodiment.

FIG. 7 depicts a method of setting up the initial parameters for practicing at least one embodiment of the invention. The method begins at 701, and proceeds to 703 for the selection of a modulation and coding scheme for the primary version of the information and redundancy versions. For example, a message to be transmitted using the EDGE air interface may use 8PSK modulation and be encoded in the MSC-6 coding scheme. In this example, the corresponding redundancy versions could then be MCS-3 encoded using GMSK modulation. However, the invention is not limited to these examples and other combinations of encoding schemes known by those of ordinary skill in the art may be used with the invention. Further, the modulation and coding scheme do not necessarily need to be selected each time a message is transmitted. Instead, a default modulation and coding scheme may be used, or a predefined modulation and coding scheme for a given set of circumstances. For instances in which the coding scheme is being selected, either as a default scheme or for a particular communication, it is appropriate to tailor the encoding scheme selection to the prevailing conditions. For example, if the reception conditions are very good, a minimal impact redundancy scheme may be selected (i.e., the redundancy scheme which takes up the least resources may be determined to be appropriate). On the other hand, if reception conditions are poor and error rates are running at relatively high levels, a more robust redundancy scheme may be selected, which is likely to use relatively more resources as a tradeoff for providing better error recovery capabilities. For example, one incremental redundancy plan which provides very robust results is to encode the primary version of the information as one MCS-9 transmission, and have the first redundancy version consist of two MCS-6 transmissions and a second redundancy version consisting of four MCS-3 transmissions. Two separate redundancy versions encoded in different formats, in addition to the initial message (primary version), provide very good error recovery capabilities.

Once the coding scheme has been selected in block 703, the method proceeds to 705 where a transmission strategy is determined. The term transmission strategy is used herein to include the relative timing for sending the various transmissions/retransmissions. For example, the primary version of the information could be sent first (e.g, 501 of FIG. 5), and one or more redundancy versions simultaneously sent at a later time (e.g., 503 and 505 of FIG. 5). In at least one embodiment, a second redundancy version is sent. This may be done at the same time the first redundancy version is sent (e.g., same time period as 503 and 505), or may be performed at a later time. Alternatively, all versions (e.g., the primary version and all redundancy versions) may be sent at the same time (e.g., FIG. 4 or FIG. 6). In at least one embodiment of the invention the transmission strategy may be predetermined so that the receiver knows when and where to monitor a second carrier, or simultaneously monitor two or more carriers, in order to receive the redundancy versions. Having the transmission strategy prearranged avoids the need for out-of-band signaling as is required in conventional systems.

The selection of a coding scheme in block 703 and prearranging transmission strategy in block 705 may affect each other, and may be performed either in tandem or in any order. For example, it may be possible to select a transmission strategy (705) before choosing a coding scheme (703). These activities may be performed during an initial step-up stage or provisioning period and set as a default condition. The choice of a coding scheme and transmission strategy may be later altered, as needed, to better adapt to current conditions; e.g., reception conditions, communication traffic patterns and schedules, revenue considerations, as well as various other like types of conditions such as the timing and quality considerations dependent upon various types of content. For instance, the transmission of voice needs real-time error recovery (or very small delays for error recovery) versus content in which minor delays may be acceptable such as Internet browsing or email applications.

Once the coding schemes and transmission strategies have been selected, the method proceeds to 707 for the selection of any other communication protocols, as are known by those of ordinary skill in the art. Such protocols may include the parameters used in provisioning various network equipment (e.g., SGSN 102, BSC/BTS 104 and/or mobile units 120 of FIG. 1A), or parameters needed to set up or tear down communications links. Once the communication protocols have been selected in block 707, the method proceeds to 709 where it is completed. In 709 the various parameters, which were selected in 701 through 707, may be stored for future use, and communicated to those portions of the system where needed. The parameters may be stored in memory 108 of the SGSN 102 shown in FIG. 1A, or elsewhere within the system.

Figure 8:
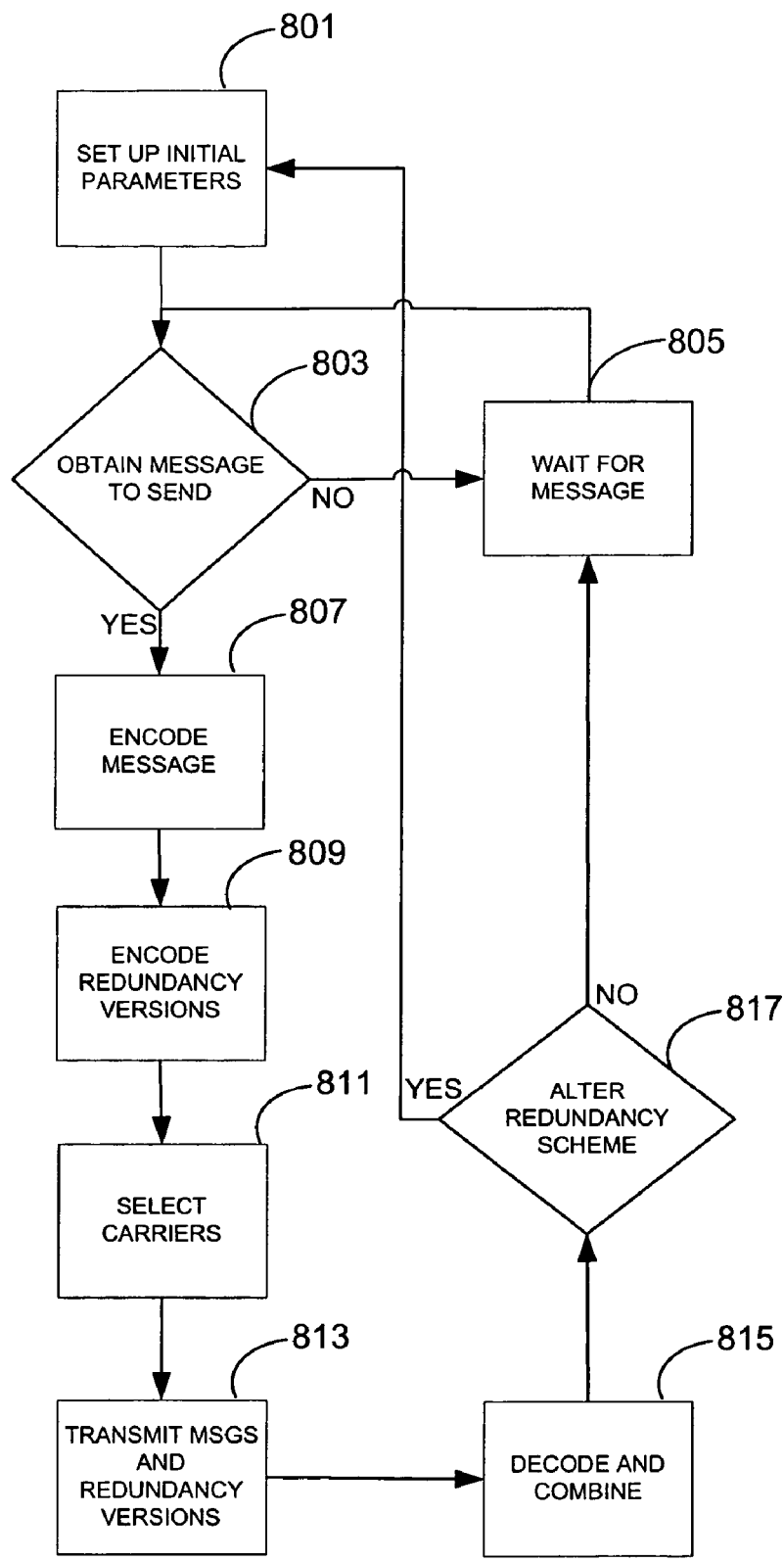
FIG. 8 depicts a method to provide error recovery for wireless communication systems in accordance with at least one embodiment.

FIG. 8 depicts a method for practicing at least one embodiment of the invention to provide error recovery for wireless communication systems. In block 801, the initial parameters are set up as explained above in conjunction with FIG. 7. Once the initial parameters have been set up, the method proceeds to 803 where it is determined whether there is information to be transmitted. If there is no information to be transmitted, the method proceeds according to the "NO" branch from 803 to block 805 to wait for a message, and then loops back to 803 to again determine whether there is a message to be transmitted. In block 803, if it is determined that there is information to be transmitted, the method proceeds according to the "YES" branch from 803 to 807 to encode the information to be transmitted. In some embodiments, even if it has been determined that there is information to be transmitted and the method has proceeded to block 807 or further for processing the information, the system also continues to monitor for additional messages to be transmitted in accordance with block 805. That is, some steps for processing messages to be transmitted may be handled in parallel as the system continues to monitor for new messages to be transmitted in block 805. In block 807, the message is encoded according to the protocols previously defined in the initialization phase, as depicted in FIG. 7.

In one exemplary embodiment, the primary version of the message may be encoded using one MCS-9 transmission. Once the primary version of the message has been encoded, the method proceeds to 809 to encode one or more redundancy versions. For example, given the exemplary embodiment using one MCS-9 block for the primary version of the information, a first redundancy version may consist of two MCS-6 transmissions along with a second redundancy version of four MCS-3 transmissions. It should be noted that most embodiments described herein involve actions taken to handle the redundancy versions (blocks 809-815) in response to the primary version being obtained and encoded, not in response to receiving any sort of out-of-band signal to send a redundancy version. A redundancy version is considered to be transmitted in response to the transmission of the primary version when, as a result of obtaining the information to send in block 803 the system encodes one or more redundancy versions for transmission. This is evident, for example, from FIG. 4 in which all versions are sent simultaneously. In embodiments in which the redundancy versions are not sent simultaneously with the primary version, but are sent within the same transmission time period (i.e., at a time after the primary version transmission begins up until the start of the next primary version) the redundancy versions are sent in response to transmission of the primary version. In some implementations (e.g., some embodiments in a GSM system), a transmission time period will be equal to the time duration of a frame. Once the redundancy versions have been encoded the method proceeds to block 811.

In block 811 the carriers may be selected in accordance with the communication scheme being used, or to conform to the protocols or specifications of the system. Once the carriers for the primary version and the one or more redundancy versions have been selected, the method proceeds to 813 where the various versions are transmitted, either simultaneously or in some staggered manner, for example, as per the exemplary embodiments discussed in conjunction with FIGS. 3-6. As discussed above, the transmission of the redundancy versions may be performed in response to the primary version being transmitted, not in response to receiving any sort of out-of-band signal with information of a data failure or instructions to send a redundancy version. The transmission of the primary version and redundancy version(s) typically takes place from a stationary base station (e.g., BSC/BTS 104 of FIG. 1A) to a mobile unit (e.g., 120). Hence, blocks 801-813 typically take place in a stationary BTS or SGSN, while block 815 (and the blocks of FIG. 9) typically occur in a mobile unit. However, in some embodiments the mobile unit may transmit a primary version and one or more redundancy versions. The message transmissions taking place in block 813 may be a single transmission (e.g., SMS message) or may be one of a number of transmissions (e.g., a bit of speech being transmitted as part of an on-going telephone conversation). For each primary transmission and the associated redundancy versions, the transmission of block 813 may be followed by block 815 for decoding the various transmissions, and combining them if an error is detected. The various embodiments may use any of selection combining, soft combining, and/or selective soft combining, depending upon the scheme being implemented and prevailing reception conditions. Once the transmissions have been decoded and combined to produce a combined version of the received transmissions, the method proceeds to block 817. In an alternative embodiment, block 817 is performed only once (or not at all) before the communication link is torn down. In some embodiments or in certain situations block 817 is not performed, and instead the method proceeds directly from block 815 to 805.

In 817, it is determined whether conditions exist to warrant changes or updates to the redundancy scheme, or aspect of it. For example, if a redundancy scheme is in place which calls for only one redundancy version and the error rate is still at an unacceptably high level, the conditions may warrant changing the redundancy scheme to transmit two or more redundancy versions associated with the primary version. Another example of an alteration to the redundancy scheme may come in the form of changing the method of combining the redundancy versions. For example, if the redundancy scheme in place uses selection combining, but the error rate is higher than a predetermined threshold, then the scheme may be changed to soft combining or selective soft combining, in an effort to provide better error recovery if the prevailing air interface conditions are preventing error recovery. Block 817 may involve changing carriers to avoid interference and/or transmission errors due to fading, which may be correlated to particular frequencies in a given set of conditions. Since different transmissions sent on different carriers may be subject to varying amounts of attenuation, a change in carrier frequency may improve the error recovery results. Further, block 817 may include any changes made due to new versions of software, downloaded patches, updates to incorporate modifications to telecom specifications, or other like types of periodic maintenance to the system. Upon completion of 817 and once any changes or updates to the redundancy scheme have been implemented, the method proceeds back to 805 to wait for the next message to be transmitted.

Figure 9:
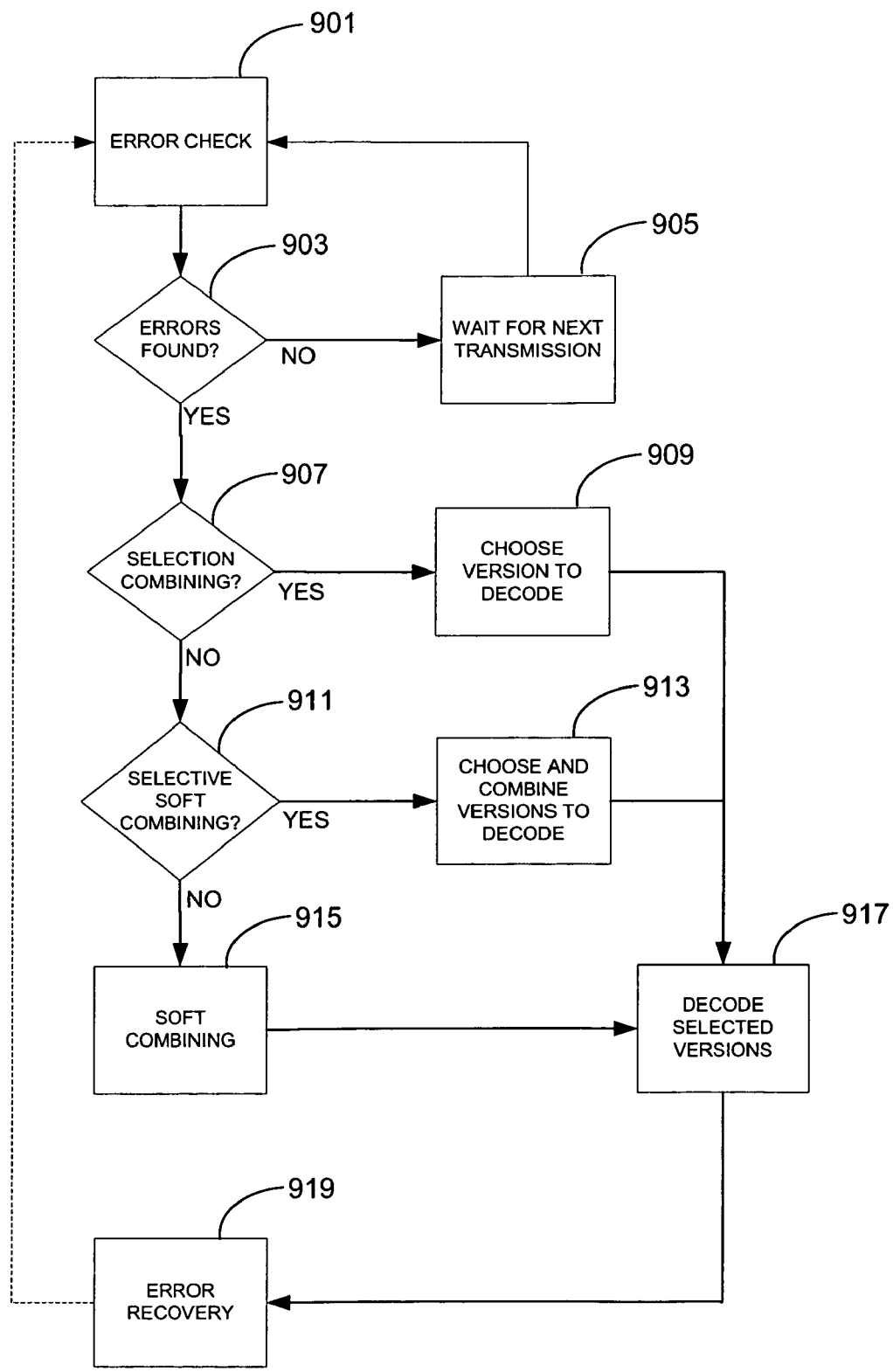
FIG. 9 depicts a block diagram of a method of decoding and combining redundancy versions according to at least one embodiment.

FIG. 9 depicts a block diagram for a method of decoding and combining redundancy versions according to at least one embodiment. Typically these activities take place in a mobile unit or other receiver in which embodiments of the invention are implemented. The blocks depicted in FIG. 9 provide some detail about decoding, combining and error recovery that may take place in the block 815 of the previous figure. The method begins in block 901 where an error check is performed to determine whether the primary version of the transmitted information contains errors. The error check may involve any sort of routine or algorithm specified by the system, the system operator, or conducted within the mobile unit itself. For example, the error detection may involve a redundancy check such as checksum, a cyclical redundancy check (CRC), a frame check sequence (FCS), or error correction codes (ECC) such as Hamming codes, Reed-Solomon code, Reed-Muller code, Binary Golay code, convolutional code, turbo code, or other like type of error detection or detection/correction scheme. These, or other like routines known to those of ordinary skill in the art, may be used in an error recovery scheme. Different types of actions may be taken in block 901 to ascertain whether there are errors such as making a channel measurement or received power measurement, a positive or a negative ACK, an implicit estimate of mobile unit reception quality, or any other like type of routine or test for errors in reception known to those of ordinary skill in the art. Alternatively, if the reception conditions are known to be below a predetermined level, a received transmission may be assumed to contain errors for the purpose of utilizing the redundancy versions transmitted in accordance with embodiments of the invention until such time as reception conditions are known to improve. Upon completion of error detection in block 901, the method proceeds to the decision block 903. If no error is detected in the transmission, the method proceeds from block 903 to block 905 in accordance with the "NO" branch to wait for another transmission and then loops back to block 901. In some embodiments, a default condition may be specified in which one or more of the redundancy versions are combined with the primary version (the "YES" branch) regardless of whether or not errors have been detected. In the event an error is detected, the method proceeds from block 903 to block 907 in accordance with the "YES" branch for determination of whether selection combining is to be performed.

The method of error recovery may be predetermined to default to selection combining, selective soft combining, soft combining, or a combination of these error recovery routines. Alternatively, the type of error recovery may be varied or otherwise selected to best suit the conditions, depending upon the reception conditions, prevailing traffic conditions, economics or other like parameters for selecting a type of error recovery. In any event, at block 907 if selection combining is to be used the method proceeds in accordance with the "YES" branch to block 909 where a redundancy version of the message is selected for use in error recovery. If, at block 907, it is determined that selection combining is not to be used for error recovery, the method proceeds from 907 to 911 where it is determined whether selective soft combining is to be used. If, at block 911, it is determined that selective soft combining is to be used for error recovery the method proceeds from 911 to 913 via the "YES" branch for the selection and soft combining of one or more redundancy versions so that selective soft combining error recovery may be performed. If selective soft combining is not to be used, the method proceeds from block 911 to block 915 in accordance with the "NO" branch. If it is determined that selection combining (907) and selective soft combining (911) are not to be used, in accordance with block 915 the available redundancy versions may be soft combined for use in error recovery.

Once one of the error recovery techniques have been chosen (e.g., selection combining, selective soft combining, soft combining, or other like error recovery technique), the method proceeds to block 917 and the selected redundancy version, or the soft-combination of the selected redundancy versions, are decoded. Once the aforementioned process is completed the method proceeds to 919 for an error recovery routine. Block 919 may entail similar activities to those performed in error checking the primary version in block 901 (or block 815 of the previous figure). In some embodiments, if the error recovery of block 919 fails, the method loops back to 901 for further processing of the data. This is depicted as a dotted line between 919 and 901. For example, in a first pass selection combining may have been chosen (or prearranged) in accordance with block 907. On a second pass, in block 907 a second redundancy version could be combined with the primary version and the first redundancy version, or alternately, soft combining (915) or selective combining (911) may be selected on the second or subsequent passes.

The figures are provided to explain and enable the invention and to illustrate the principles of the invention. Some of the activities for practicing the invention shown in the method block diagrams of the figures may be performed in an order other than that shown in the figures. For example, in FIG. 8 the selection of the carriers (811) may take place before encoding the redundancy versions (809). Further, those of ordinary skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skilled in the art will also appreciate that the various illustrative logical blocks, modules, circuits, and algorithm routines described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Practitioners of ordinary skill in the art will know to implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, computer or state machine. A processor may also be implemented as a combination of computing devices, e.g., a combination of a DSP and a microprocessor, a plurality of microprocessors, one or more microprocessors in conjunction with a DSP core, or any other such configuration.

The activities of methods, routines or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor in such a manner that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Various modifications to the illustrated and discussed embodiments will be readily apparent to those of ordinary skill in the art, and the principles defined herein may be applied to other embodiments without departing from the spirit or scope of the invention. Thus, the present invention is not intended to be limited to the embodiments shown herein but is to be accorded the widest scope consistent with the principles and novel features disclosed herein.

In describing various embodiments of the invention, specific terminology has been used for the purpose of illustration and the sake of clarity. However, the invention is not intended to be limited to the specific terminology so selected. It is intended that each specific term includes equivalents known to those of skill in the art as well as all technical equivalents which operate in a similar manner to accomplish a similar purpose. Hence, the description is not intended to limit the invention. The invention is intended to be protected broadly within the scope of the appended claims.

The invention claimed is:

1. A method of providing redundancy for error recovery in multi-carrier wireless communications, the method comprising:
   selecting a transmission strategy at least partially based on a data reception condition indication of a transmission, the data reception condition indication received from a mobile device;
   encoding a primary version of information to be transmitted with a first encoding scheme;
   encoding a redundancy version of the information to be transmitted with a second encoding scheme;
   transmitting the primary version of the information encoded with the first encoding scheme, the primary version being transmitted on a first carrier; and
   transmitting the redundancy version of the information encoded with the second encoding scheme, at least part of the redundancy version being transmitted on a second carrier;
   wherein encoding and transmitting the primary version and the redundancy version are performed in accordance with the selected transmission strategy and wherein selecting the transmission strategy includes determining whether the first carrier has a first frequency that is prone to fading and in response to determining that the first frequency is prone to fading, selecting the second carrier to have a second frequency that is different from the first frequency and selecting the second encoding scheme to match the first encoding scheme.

2. The method of claim 1, wherein the transmission strategy specifies at least one of a predetermined number of redundancy versions to be transmitted, timing information for sending the redundancy version relative to the primary version, and coding schemes for encoding the primary version and the redundancy version.

3. The method of claim 2, wherein the timing information constrains the redundancy version to be transmitted prior to an earliest possible reception of an automatic retransmission request signal from the mobile device responsive to the primary version.

4. The method of claim 1, wherein the first encoding scheme is selected from a group consisting of MCS-9, MCS-6 and MCS-3.

5. The method of claim 1, wherein the redundancy version is transmitted in two or more transmissions, one of the two or more transmissions being transmitted on a third carrier within the same transmission time period as the primary version.

6. The method of claim 1, wherein the redundancy version is a first redundancy version, the method further comprising:
   encoding a second redundancy version of the information with a third encoding scheme; and wirelessly transmitting to a receiver, on a third carrier, the second redundancy version of the information encoded with the third encoding scheme.

7. The method according to claim 6, further comprising bit stuffing at least one redundancy version, wherein the bit stuffing offsets differing block sizes of the encoding schemes.

8. The method of claim 6, wherein the first encoding scheme and the third encoding scheme belong to the same encoding scheme family.

9. The method of claim 1, wherein the primary version is transmitted via a base station to the mobile device.

10. The method of claim 1, wherein a period from the transmission of the primary version to the transmission of a next primary version comprises a frame, wherein each frame comprises a plurality of slots.

11. The method of claim 1, wherein the mobile device receives the primary version and the redundancy version.

12. An apparatus for providing redundancy for error recovery in multi-carrier wireless communications, the apparatus comprising:
   means for selecting a transmission strategy at least partially based on a data reception condition indication of a transmission, the data reception condition indication received from a mobile device;
   means for encoding a primary version of information to be transmitted with a first encoding scheme;
   means for encoding a redundancy version of the information to be transmitted with a second encoding scheme;
   means for transmitting the primary version of the information encoded with the first encoding scheme, the primary version being transmitted on a first carrier; and
   means for transmitting the redundancy version of the information encoded with the second encoding scheme, at least part of the redundancy version being transmitted on a second carrier;
   wherein encoding and transmitting the primary version and the redundancy version are performed in accordance with the selected transmission strategy and wherein selecting the transmission strategy includes determining whether the first carrier has a first frequency that is prone to fading and in response to determining that the first frequency is prone to fading, selecting the second carrier to have a second frequency that is different from the first frequency and selecting the second encoding scheme to match the first encoding scheme.

13. The apparatus of claim 12, wherein the transmission strategy specifies a predetermined number of redundancy versions to be transmitted.

14. The apparatus of claim 12, wherein the transmission strategy specifies timing information for sending the redundancy version relative to the primary version.

15. The apparatus of claim 12, wherein the transmission strategy specifies coding schemes for encoding the primary version and the redundancy version.

16. The apparatus of claim 12, wherein the redundancy version is a first redundancy version, the apparatus further comprising:
   means for encoding a second redundancy version of the information with a third encoding scheme; and
   means for wirelessly transmitting to a receiver, on a third carrier, the second redundancy version of the information encoded with the third encoding scheme.

17. The apparatus of claim 16, wherein the receiver is a mobile unit and the primary version is transmitted via a base station to the mobile unit.

18. The apparatus of claim 16, wherein the first encoding scheme and the third encoding scheme belong to the same encoding scheme family.

19. The apparatus according to claim 16, further comprising bit stuffing at least one redundancy version, wherein the bit stuffing offsets differing block sizes of the encoding schemes.

20. The apparatus of claim 12, wherein a period from the transmission of the primary version to the transmission of a next primary version comprises a frame.

21. The apparatus of claim 12, wherein the redundancy version is transmitted in two or more transmissions, one of the two or more transmissions being transmitted on a third carrier within the same transmission time period as the primary version.

22. A communication device for providing redundancy for error recovery in multi-carrier wireless communications, the device comprising:
  logic to select a transmission strategy at least partially based on a data reception condition indication of a transmission, the data reception condition indication received from a mobile device;
  an encoder for encoding a primary version of information to be transmitted with a first encoding scheme, and encoding a redundancy version of the information to be transmitted with a second encoding scheme; and
  a transmitter for transmitting the primary version of the information encoded with the first encoding scheme, the primary version being transmitted on a first carrier, and transmitting the redundancy version of the information encoded with the second encoding scheme, at least part of the redundancy version being transmitted on a second carrier;
  wherein encoding and transmitting the primary version and the redundancy version are performed in accordance with the selected transmission strategy, wherein selecting the transmission strategy includes determining whether the first carrier has a first frequency that is prone to fading, and wherein in response to determining that the first frequency is prone to fading, the second carrier is selected to have a second frequency that is different from the first frequency and the second encoding scheme is selected to match the first encoding scheme.

23. The device of claim 22, wherein the transmission strategy specifies a predetermined number of redundancy versions to be transmitted.

24. The device of claim 22, wherein the transmission strategy specifies timing information for sending the redundancy version relative to the primary version.

25. The device of claim 22, wherein the transmission strategy specifies coding schemes for encoding the primary version and the redundancy version.

26. The device of claim 22, wherein the redundancy version is transmitted in two or more transmissions, one of the two or more transmissions to be transmitted on a third carrier within the same transmission time period as the primary version.

27. The device of claim 22, wherein a period from the transmission of the primary version to the transmission of a next primary version comprises a frame, wherein each frame comprises a plurality of slots.

28. A computer program product for error recovery in multi-carrier wireless communications, comprising:
  a non-transitory computer readable medium comprising:
    code for causing a computer to select a transmission strategy at least partially based on a data reception condition indication of a transmission, the data reception condition indication received from a mobile device;
    code for causing the computer to encode a primary version of information to be transmitted with a first encoding scheme;
    code for causing the computer to encode a redundancy version of the information to be transmitted with a second encoding scheme;
    code for causing the computer to transmit the primary version of the information encoded with the first encoding scheme, the primary version being transmitted on a first carrier; and
    code for causing the computer to transmit the redundancy version of the information encoded with the second encoding scheme, at least part of the redundancy version being transmitted on a second carrier;
    wherein encoding and transmitting the primary version and the redundancy version are performed in accordance with the selected transmission strategy, wherein selecting the transmission strategy includes determining whether the first carrier has a first frequency that is prone to fading, and wherein in response to determining that the first frequency is prone to fading, the code for causing the computer to select a transmission strategy to select the second carrier to have a second frequency that is different from the first frequency and to select the second encoding scheme to match the first encoding scheme.

* * * * *